United States Patent [19]

Betz

[11] E Re. 30,269

[45] Reissued May 6, 1980

[54] WOOD FLY ASH REDUCTION METHOD

[76] Inventor: Erwin C. Betz, 525 Mill Valley Rd., Palatine, Ill. 60067

[21] Appl. No.: 921,363

[22] Filed: Jul. 3, 1978

Related U.S. Patent Documents

Reissue of:

[64] Patent No.: 3,978,197
Issued: Aug. 31, 1976
Appl. No.: 607,469
Filed: Aug. 25, 1975

[51] Int. Cl.[2] ..... C01B 33/32

[52] U.S. Cl. ..... 423/332; 423/210; 44/1 E; 110/342

[58] Field of Search ..... 423/210, 215.5, 332, 423/334; 44/1 E, 6, 16 C, 16 E; 110/1 H, 1 J, 1 K, 7 A, 342

[56] References Cited

U.S. PATENT DOCUMENTS

| | | | |
|---|---|---|---|
| 1,668,643 | 5/1928 | Hart | 44/16 E |
| 1,955,574 | 4/1934 | Benner et al. | 110/1 H |

*Primary Examiner*—Earl C. Thomas
*Attorney, Agent, or Firm*—Hume, Clement, Brinks, Willian & Olds, Ltd.

[57] ABSTRACT

A method is disclosed for substantially reducing the potassium oxide context of wood fly ash contained in the combustion products generated during the burning of wood particles. The method disclosed involves mixing an alkali metal silicate, a secondary alkali metal compound and silica with the wood particles, burning the mixture, and withdrawing a stable, potassium oxide containing silicate product from the flue gases.

12 Claims, No Drawings

WOOD FLY ASH REDUCTION METHOD

Matter enclosed in heavy brackets [ ] appears in the original patent but forms no part of this reissue specification; matter printed in italics indicates the additions made by reissue.

Most woods contain from about 0.5 to 2.0 weight percent of noncumbustible materials. The largest component of this noncumbustible material is generally potassium oxide, $K_2O$. When waste wood particles such as wood chips or sawdust are burned, the noncumbustible materials remain as a wood fly ash which normally is carried out with the combustion products through the flue gas stack into the atmosphere. With the present day concern about emission of pollutants into the atmosphere, legislation limits the amount of fly ash which can be discharged to the atmosphere. Accordingly, methods are being sought to reduce or substantially eliminate the amount of fly ash which is discharged into the atmosphere.

The present invention relates to a method for reducing the potassium oxide content of wood fly ash contained in the combustion products generated during the burning of wood particles and therefore for reducing the total amount of fly ash which would be discharged into the atmosphere. This method involves mixing an alkali metal silicate having a melting point below 1200° C., a secondary alkali metal compound having a melting point below 1200° C., and silica with the wood product such as sawdust prior to or during burning; burning the mixture in a conventional combustion chamber; and withdrawing a stable, potassium oxide containing silicate product having a melting point below 1200° C. from the flue gases as molten slag. The alkali metal silicate, the secondary alkali metal compound and the silica are all present in amounts effective to form the stable potassium oxide containing silicate product having a melting point below 1200° C. The mixture present in the combustion chamber is [also] kept deficient in *this* [alkali metal] silicate *product* in order that the potassium oxide may be withdrawn or extracted from the wood fly ash.

The alkali metal silicates useful in this invention are silicates of Group I A elements. Alkali metal silicates useful in the process of this invention will have a melting point not greater than 1200° C. Advantageously, the melting point will be greater than 500° C., and preferably will be between 750° C. and 1000° C. Advantageously, the alkali metal silicate is a potassium silicate, a sodium silicate or a lithium silicate. Preferably, the alkali metal silicate is selected from one of the following compounds: potassium tetrasilicate ($K_2O.4SiO_2$), potassium metasilicate ($K_2O.SiO_2$), [sodium] *potassium* disilicate ($K_2O.2SiO_2$), sodium lithium metasilicate ($Na_2O.Li_2O.2SiO_2$), and sodium disilicate [($Na_2.2SiO_2$)] *($Na_2O.2SiO_2$)*.

By the term secondary alkali metal compound, I mean an alkali metal carbonate, an alkali metal hydroxide, a second alkali metal silicate, and the like. Again, the alkali metal will be from Group I A of the Periodic Table of Elements.

Secondary alkali metal compounds useful in the process of this invention will be those alkali metal carbonates, alkali metal hydroxides, alkali metal silicates and the like that have a melting point not greater than 1200° C. While the secondary alkali metal compound may be selected from those containing any Group I A element, it will advantageously be one containing potassium, sodium, lithium, or mixtures thereof. Preferred secondary alkali metal compounds are lithium carbonate ($Li_2CO_3$), sodium carbonate ($Na_2CO_3$), potassium carbonate ($K_2CO_3$), or any of the preferred alkali metal silicates described above.

Advantageously, the secondary alkali metal compound will have a melting point above about 500° C. and preferably between the range of 750° C. and 1000° C.

The preferred form of silica for use in the process described herein are low cristobalite silica which has a melting point of 1713° C. and low tridymite silica.

In accordance with the process of this invention, the alkali metal silicate, the secondary alkali metal compound, and silica are mixed with the waste wood particles which are generally in the form of sawdust or chips. While the mixing preferably takes place prior to the charging of the wood particles to the combustion chamber, it is contemplated that one or more of the materials to be mixed with the wood particles can be charged directly to the combustion chamber in which the wood particles are being burnt.

The alkali metal silicate, the secondary alkali metal compound, and silica are added to the wood particles in amounts which are effective to cause the formation of a stable, potassium oxide containing silicate product which has a melting point below 1200° C. Preferably, the stable potassium oxide containing silicate product has a melting point above 500° C. and more preferably has a melting point between 750° C. and 1000° C. [When charging or mixing the additive materials to the wood particles, it] *It* is important that the mixture be kept deficient in [alkali metal] *the* silicate *product* in order that the potassium oxide contained in the wood fly ash can be withdrawn or extracted from it.

The preferred stable potassium oxide containing silicate final product mixtures are the potassium lithium silicates and the sodium potassium lithium silicates and include compounds such as $2K_2O.Li_2O.6SiO_2$, $5K_2O.Li_2O.4SiO_2$, $K_2O.Li_2O.4SiO_2$, and $Na_2O.K_2O.Li_2O.6SiO_2$.

The amounts of the various materials which are added to the wood particles are based on the amount of potassium oxide contained in the wood fly ash. This figure is either known from the type of wood particles to be burned or can be readily determined by well known techniques. The following amounts are normally added per mole of potassium oxide present in the wood fly ash: from 0.5 to 3 moles of alkali metal silicate with the preferred amount ranging from 1 to 2; from 0.5 to 1.5 moles of the secondary alkali metal compound, preferably from 0.5 to 0.8; and from 2 to 6 moles, preferably from 2 to 2.8 moles, of silica.

An illustrative embodiment of the present invention involves the production of $2K_2O.Li_2O.6SiO_2$ as the stable silicate product. This compound has a melting point of 815° C. Potassium tetrasilicate ($K_2O.4SiO_2$) which has a melting point of 770° C. is ground to a 16–35 mesh particle size. For each mole of potassium oxide contained in the wood sawdust, there is added to the sawdust one mole of the potassium tetrasilicate, ½ mole of lithium carbonate and 2⅔ moles of silica. This mixture is then mixed in a rotating drum and is then fed to a wood particle burner. In the burning chamber, the organic portion of the sawdust is converted to carbon monoxide and carbon dioxide. The compound $2K_2O.$-

$Li_2O.6SiO_2$ is formed by a chemical reaction between the potassium tetrasilicate, lithium carbonate and silica added to the sawdust and the potassium oxide present in the noncombustible wood residue. This compound melts because of the extremely high temperature present and can be removed from the flue gases as a molten slag. Approximately two-thirds of a mole of $2K_2O.Li_2O.6SiO_2$ is formed for every mole of potassium oxide present in the sawdust. As a result of treating the sawdust with the mixture of compounds disclosed herein, the flue gas discharged to the atmosphere contains substantially less potassium oxide then it would have had the sawdust not been so treated.

Although a number of specific embodiments have been set forth herein, the present invention is is no way intended to be limited to them. It is intended that various modifications, alteration, and changes can be made in the disclosed embodiments without departing from the spirit and scope of this invention as defined by the following claims.

I claim:

1. A method for reducing the potassium oxide content of the wood fly ash contained in the combustion products generated by the burning of wood particles, which comprises:

mixing with the wood particles, an alkali metal silicate having a melting point below 1200° C., a secondary alkali metal compound having a melting point below 1200° C., and silica;

burning the mixture; and withdrawing a stable potassium oxide containing silicate product having a melting point below 1200° C. from the combustion products as a molten slag;

wherein the alkali metal silicate, the secondary alkali metal compound, and the silica are present in amounts effective to form the stable silica product in the presence of wood particles containing potassium oxide;

wherein the secondary alkali compound has a melting point not greater than the melting point of the stable silicate product; and wherein the mixture is kept deficient in alkali metal silicate *product* in order to withdraw the potassium oxide from the wood fly ash.

2. The method of claim 1, wherein the alkali metal silicate, the secondary alkali metal compound, and the silica are mixed with the wood particles as they are being burned.

3. The method of claim 1, wherein the alkali metal silicate, the secondary alkali metal compound, and the silica are mixed with the wood particles prior to burning.

4. The method of claim 1, wherein the alkali metal silicate is selected from the group consisting of potassium tetrasilicate, potassium metasilicate, potassium disilicate, sodium lithium metasilicate, and sodium disilicate.

5. The method of claim 1, wherein the secondary alkali metal compound is selected from the group consisting of alkali metal carbonates, alkali metal hydroxides, and a second alkali metal silicate.

6. The method of claim 1, wherein the secondary alkali metal compound is selected from the group consisting of lithium carbonate, sodium carbonate, and potassium carbonate.

7. The method of claim 1, wherein the stable potassium oxide containing silicate product is a potassium lithium silicate or a sodium potassium lithium silicate.

8. The method of claim 7, wherein the stable potassium oxide containing silicate product is selected from the group consisting of $2K_2O.Li_2O.6SiO_2$, $5K_2O.Li_2O.4SiO_2$, $K_2O.Li_2O.4SiO_2$, and $Na_2O.K_2O.Li_2O.6SiO_2$.

9. The method of claim 1, wherein from 0.5 to 3 moles of the alkali metal silicate, from 0.5 to 1.5 moles of the secondary alkali metal compound, and from 2 to 6 moles of the silica are mixed with the wood particles per mole of potassium oxide present in the wood fly ash.

*10. A method for reducing the potassium oxide content of the wood fly ash contained in the combustion products generated by the burning of wood particles, which comprises:*

*mixing with the wood particles, an alkali metal silicate having a melting point below 1200° C. selected from the group consisting of potassium tetrasilicate, potassium metasilicate, potassium disilicate, sodium lithium metasilicate, and sodium disilicate, a secondary alkali metal compound having a melting point below 1200° C. selected from the group consisting of alkali metal carbonates, alkali metal hydroxides, and a second alkali metal silicate, and silica;*

*burning the mixture; and*

*withdrawing a stable potassium oxide containing silicate product having a melting point below 1200° C. from the combustion products as a molten slag, said silicate product being a potassium lithium silicate or a sodium potassium lithium silicate;*

*wherein the alkali metal silicate, the secondary alkali metal compound, and the silica are present in amounts effective to form the stable silica product in the presence of wood particles containing potassium oxide;*

*wherein the secondary alkali compound has a melting point not greater than the melting point of the stable silicate product; and*

*wherein the mixture is kept deficient in the silicate product in order to withdraw the potassium oxide from the wood fly ash.*

*11. The method of claim 10, wherein the secondary alkali metal compound is selected from the group consisting of lithium carbonate, sodium carbonate, and potassium carbonate.*

*12. The method of claim 10, wherein the stable potassium oxide containing silicate product is selected from the group consisting of* $2K_2O.Li_2O.6SiO_2$, $5K_2O.Li_2O.4SiO_2$, $K_2O.Li_2O.4SiO_2$, *and* $Na_2O.K_2O.Li_2O.6SiO_2$.

* * * * *